United States Patent [19]

Guterman

[11] Patent Number: 4,782,276

[45] Date of Patent: Nov. 1, 1988

[54] ELECTRIC SIGNAL GENERATOR SYSTEM AND ITS APPLICATION

[75] Inventor: Charles Guterman, Gif Sur Yvette, France

[73] Assignee: Solems, Palaiseau, France

[21] Appl. No.: 35,335

[22] Filed: Apr. 7, 1987

[30] Foreign Application Priority Data

Apr. 8, 1986 [FR] France ................................. 86 05005

[51] Int. Cl.⁴ ........................................... G05B 19/40
[52] U.S. Cl. ................................... 318/685; 318/696; 356/226
[58] Field of Search ............... 318/685, 696; 368/205, 368/149; 356/226

[56] References Cited

U.S. PATENT DOCUMENTS 3,724,200  4/1973  Donner ................................. 368/149
4,218,140  8/1980  Johnston et al. ..................... 356/226

FOREIGN PATENT DOCUMENTS 1391339  1/1965  France .
2071423  9/1981  France .
53-84769  7/1978  Japan ................................... 368/205

OTHER PUBLICATIONS

Hood, "555-Type Integrated Circuits", Wireless World, vol. 88, No. 1555, Apr., 1982, pp. 41-43.

Primary Examiner—William M. Shoop, Jr.
Assistant Examiner—M. Bergmann
Attorney, Agent, or Firm—Pollock, VandeSande & Priddy

[57] ABSTRACT

The invention concerns an electrical signal generator system and its applications. According to the invention, the signal generator system includes at least one electric current generator of the photovoltaic cell type and an impulse generator fed by the cell, and delivering a signal which is a function of the electrical energy delivered by the cell. The invention is applicable in particular to driving a step-by-step motor or to feeding a light integrator.

13 Claims, 2 Drawing Sheets

4,782,276

ELECTRIC SIGNAL GENERATOR SYSTEM AND ITS APPLICATION

FIELD OF THE INVENTION

The invention concerns a system for generating electric signals and a system for driving a moving body by means of a motor of the step-by-step type driven by the electric signal generator of the invention.

The generator system according to the invention is in particular intended to be utilized, as has just been stated, to feed a step-by-step motor, or to feed a light integrator of the photometer type, particularly as a function of the light intensity prevailing in the environment in which the generator system is placed.

BACKGROUND OF THE INVENTION

So far as is known by Applicant, there exists no electric signal generator fed by a current generator of the photovoltaic cell type and capable of delivering an output signal as a function of the electrical energy delivered by the cell.

SUMMARY OF THE INVENTION

Thus, one of the essential objectives of the invention is to provide a signal generator system consisting of:

a generator of low-energy electric current, such as a photovoltaic cell, and an impulse generator fed by said cell and delivering a signal which is a function of the electric energy delivered by the cell.

According to a complementary characteristic of the invention, an impulse generator of a first type is provided, including in particular another photovoltaic cell illuminated by a light source, a condenser fed by said other cell, and an astable multivibrator controlled by said condenser and delivering an electric signal whose frequency is essentially proportional to the amount of light picked up by said other cell.

In this way, by means of a relatively simple electronic circuit based on rather inexpensive components, it is possible to put together a generator delivering impulses whose frequency is essentially proportional to the amount of light received by a photovoltaic cell serving as pickup.

According to one embodiment of the invention, an impulse generator of a second type is provided, including a voltage divider, a programmer, and an astable multivibrator serving as a cadence generator controlled by said programmer and delivering an electric signal whose frequency is essentially constant.

In this way, by means of relatively common and inexpensive electronic components, it is possible to put together a generator that delivers impulses whose frequency is essentially constant.

According to the invention, the signal generator system is in particular intended to drive a step-by-step motor. As is understood, this motor will be driven at an essentially constant speed, should one choose to utilize the second type of impulse generator, i.e., the "constant-frequency" type. On the other hand, if one chooses the first type of impulse generator, i.e., with "frequency proportional to illumination," the motor will then be driven at an essentially variable speed as a function of the amount of light received by the photovoltaic cell serving as a pick-up.

Another application of the signal generator with light integrator is also envisaged. In this case, as is understood, the impulse generator of the second type, with "frequency proportional to illumination," will be utilized.

In accordance with the foregoing, another purpose of the present invention consists of a system for driving a movable body in particular, by means of a step-by-step motor controlled by the electric signal generator of the invention.

More specifically, this drive system includes said signal generator system, said step-by-step motor, and a flexible means for coupling to the movable body to be driven.

The step-by-step motor used will be, advantageously, a clockwork motor.

BRIEF DESCRIPTION OF THE DRAWINGS

Other characteristics and advantages of the invention will appear more clearly with the aid of the following description given in reference to the accompanying drawings, in which.

DETAILED DESCRIPTION OF THE INVENTION

Figure 1:
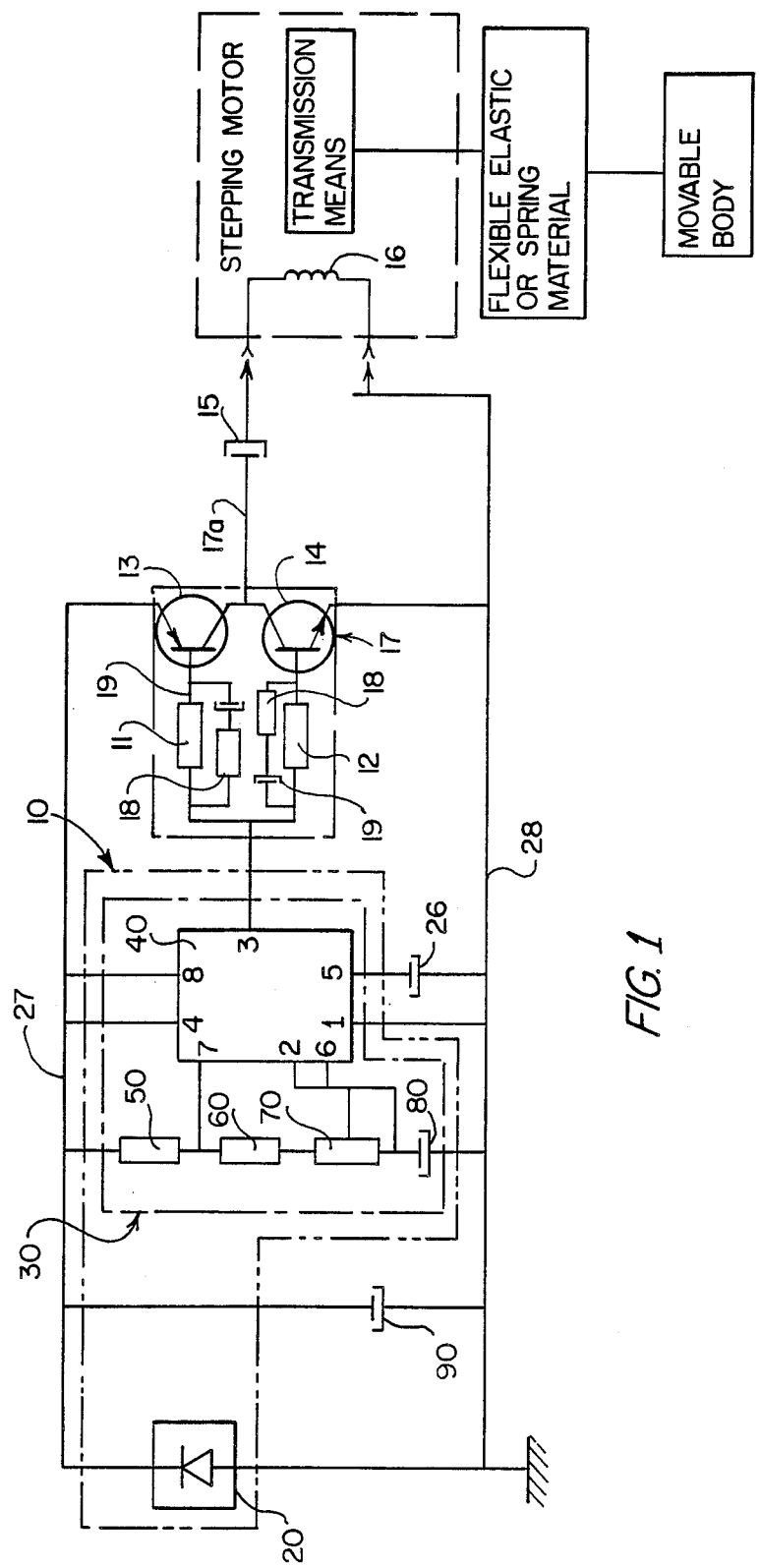
FIG. 1 is a synoptic diagram of a circuit for feeding a step-by-step motor by means of an electric signal generator delivering constant-frequency impulses.

Referring first to FIG. 1, one sees an assembly circuit for a signal generator according to the invention, of the type intended to be applied to feeding a step-by-step motor driven at constant speed.

It will immediately be noted that this circuit is, as is understood, connected to ground.

The signal generator 10 taken as a whole includes a cell 20 and an impulse generator 30.

According to the invention, a cell of the photovoltaic type is advantageously utilized as cell 20. However, in certain specific applications, and by way of technical equivalents, the use of a classic electric cell, i.e., a chemical cell, may be envisaged. Such a cell could be used, for example, if the DC generator of the invention is placed in premises that are too poorly lighted.

As it does not in itself constitute the object of the invention, the photovoltaic cell will not be described.

It will be noted that a condenser, i.e. capacitor, marked 90 is advantageously connected across the terminals of this cell 20. This capacitor serves as a filter and is intended to limit and to smooth out variations in the feed voltage delivered by the cell to the impulse generator. In particular, it permits the initial drive of the motor (represented by its coil 16) and its filtered feed.

The impulse generator 30 includes an astable multivibrator 40 and an adjustable programmer unit/signal-shaping unit including in parallel, between the feed line 27 and the ground line 28, two resistors 50, 60 mounted in series with a third 70, preferably adjustable, itself mounted in series with a capacitor 80.

In this circuit, the multivibrator 40 constitutes the system's cadence generator. The frequency of the electric signals it delivers is determined, or adjusted, by resistors 60, 70, and capacitor 80, the beat of which is set by adjusting resistor 70.

The link between the multivibrator and the programmer/shaping unit is such that the terminal 7 of the multivibrator 40 is attached at the site of the linkage between the resistors 50, 60, while its terminals 2 and 6 are connected between the adjustable resistor 70 and the capacitor 80. Furthermore, the terminal 1 of this same multivibrator is connected directly to ground, while its terminal 5 is connected to a capacitor 26, itself connected to the ground line. The terminals 4 and 8 are connected to the circuit's feed line by the cell 20. Finally, the terminal 3 is connected to an amplifying unit 16 delivering to a capacitor 15 connected to the coil 16 an amplified signal outputted thereat.

The amplifying unit 17, subjected to the voltage from the cell 20, consists of two branches, each consisting of a resistor 11 or 12 followed in series by a PNP transistor 13 or an NPN transistor 14, connected to one another at their collectors. In addition, the emitter of the transistor 13 is connected to the feed line 27, while that of the transistor 14 is connected to ground.

The system just described functions as follows.

The cell 20 is subjected to light, if necessary, and feeds the impulse generator 30.

The feed voltage at the terminals of this generator is marked V.

The capacitor 80 is then charged through the resistors 50, 60, 70 up to the voltage ⅔ V. A breaker internal to the multivibrator 40 (not shown) grounds the terminal 7, and the capacitor 80 discharges towards the multivibrator through the resistors 60 and 70 until voltage is V/3. The frequency of the charging/discharging of the capacitor 80, set by the resistors 50, 60, and 70, is, as is understood, essentially constant. The cadence imposed on the multivibrator 40 by the resistors 70, and capacitor 80 is therefore essentially constant as well.

Following the discharging of the capacitor 80, the terminal 7 again opens and the capacitor recharges up to voltage ⅔ V.

The successive charging and discharging of the capacitor drive the multivibrator 40 to deliver an electric signal at its output terminal 3. This signal is of the "square signal" type, the frequency of which is essentially constant. This signal is then amplified by the circuit of amplifying unit 17, alternately by the PNP 13 and NPN transistor 14, after having passed through the resistor 11 or 12, respectively.

At this stage of the description, it will be noted that parallel to the terminals of the resistor 11 (respectively, 12) a "buffer line," consisting of a resistor 18 connected in series with a capacitor 19, may advantageously be provided. These lines make it possible to reduce the amount of current passing through the resistors 11 and 12 during the time interval separating two successive, alternate impulses transmitted by the multivibrator 40. In this way, current consumption is appreciably reduced.

At output 17a of the amplification unit 17, the signal, which has just been amplified, is applied to a shunting circuit consisting of the capacitor 15 and the highly resistive coil 16 which closes the circuit on the ground line 28.

The voltage signal shifted by the capacitor 15, which feeds the step-by-step motor, is, as is understood, alternating and periodic.

The time interval during which this signal is established is relatively short, on the order of 50 milliseconds, for example. By way of example, the interval may be situated between two alternate, successive impulses, essentally between 200 and 300 milliseconds.

In other words, the circuit shown in FIG. 1, the operation of which has just been presented, makes it possible to feed electric energy to a step-by-step motor, which motor is controlled by impulses delivered at an essentially constant frequency, which makes it possible to ensure that its drive speed is likewise essentially constant.

However, in a use different from this step-by-step motor, it may be advantageous to vary the frequency of the signal controlling the motor in a way that is essentially proportional to the amount of light that would be received by a photovoltaic cell serving as pickup.

Figure 2:
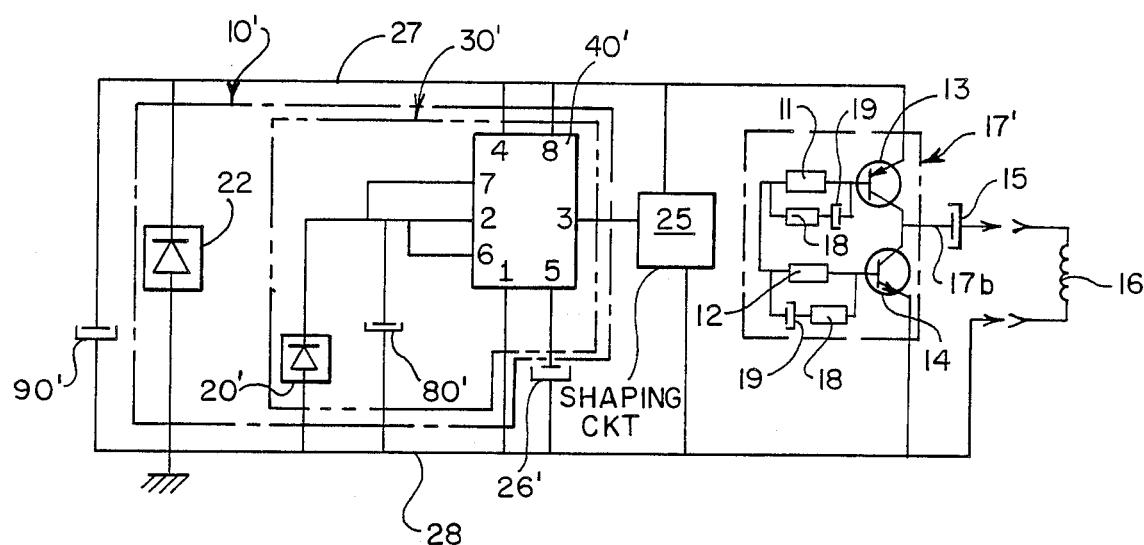
FIG. 2 is a synoptic diagram showing a variant realization of a circuit for feeding a step-by-step motor by means of an electric signal generator, the generator delivering impulses at a frequency essentially proportional to the amount of light picked up by the photovoltaic cell serving as pickup.

To this end, the invention provides for the use of an electric signal generator as illustrated in FIG. 2.

In FIG. 2, one sees a generator system marked 10′ and including a cell 22 connected to ground, and an impulse generator 30′.

The impulse generator 30′ includes an astable multivibrator 40′ of the same type as that (40) already described.

The cell 22 feeds the multivibrator 40′ with electric energy. As previously, the terminals 4 and 8 of the multivibrator are connected to the feed line 27, while the terminals 1 and 5 are linked with the ground line 28, terminal 5 through the capacitor 26′.

The cell 22 illustrated in FIG. 2 is a photovoltaic cell. However, it could also consist of a classic electric cell (chemical cell).

A capacitor 90′, the role of which is essentially like that of the capacitor 90 already presented, is advantageously connected across the terminals of the cell 22. The capacitor 90′ thus serves as a filter, integrating the variations in voltage delivered to the multivibrator, and makes it possible to assure the initial drive of the motor (represented by its coil 16) and its feed.

Programming of the frequency of the signals delivered by the multivibrator 40′ is achieved by means of a capacitor 80′ subjected to the voltage of a complementary photovoltaic cell 20° and connected to the terminals 2, 6, and 7 of this same multivibrator.

The cell 20′ and the capacitor 80′ are likewise connected to the ground line.

The photovoltaic cell 20′ constitutes an active pickup which, when subjected to illumination from a light source, charges the capacitor 80′. This charging becomes more rapid as the amount of light picked up by the photovoltaic cell 20′ increases. It will be noted that the capacitor's charging time is inversely proportional to the amount of current delivered by the cell 20′. Conversely, this current amount is essentially proportional to the intensity of the light received by the cell.

The electric signal generating system presented in FIG. 2 operates as follows.

If the voltage delivered by the cell 20′ subjected to light is marked V, the voltage triggering the capacitor 80′ is, as previously, essentially equal to ⅔ V.

Once it reaches this value, the capacitor 80′ discharges to the voltage V/3 through the terminal 7 into the multivibrator. To this end, a breaker internal to the multivibrator grounds this terminal 7.

Having reached the value V/3, the capacitor is again charged to the voltage ⅔ V, with terminal 7 closing once again.

The successive charging/discharging of the capacitor 80' sets the operating cadence of the multivibrator 40'.

In other words, in this case the capacitor 80', together with the photovoltaic cell 20', performs as cadence generator by allowing the multivibrator to develop electric impulses whose frequency is essentially proportional to the amount of light picked up by the photovoltaic cell 20'.

The signal delivered at the output terminal 3 of the multivibrator 40' is shaped in a shaping circuit 25, known in itself, which is subjected to the voltage of the cell 22 and which produces an essentially square signal the frequency of which is likewise, as is understood, essentially proportional to the light intensity picked up by the photocell 22'.

The signal coming out of the shaping circuit 25 is then amplified at an amplification unit marked 17'. This amplification unit 17' is identical and mounted onto the circuit in the same way as the one (17) presented in FIG. 1. Hence, it will not be described again.

At the output 17b of the unit 17', the amplified signal transmitted by the multivibrator is applied to a shunt circuit of the type already presented, consisting of the capacitor 15 and the coil 16 of the step-by-step motor.

In this way, and as is understood, the step-by-step motor is fed or controlled by alternating impulses the frequency of which is essentially proportional to the amount of light picked up by the photocell or photovoltaic cell 20'.

Consequently, the circuit presented in FIG. 2, the operation of which has just been explained, makes it possible to drive the step-by-step motor at a speed which is essentially proportional to the amount of light energy stored by the cell 20' serving as a pickup.

Figure 3:
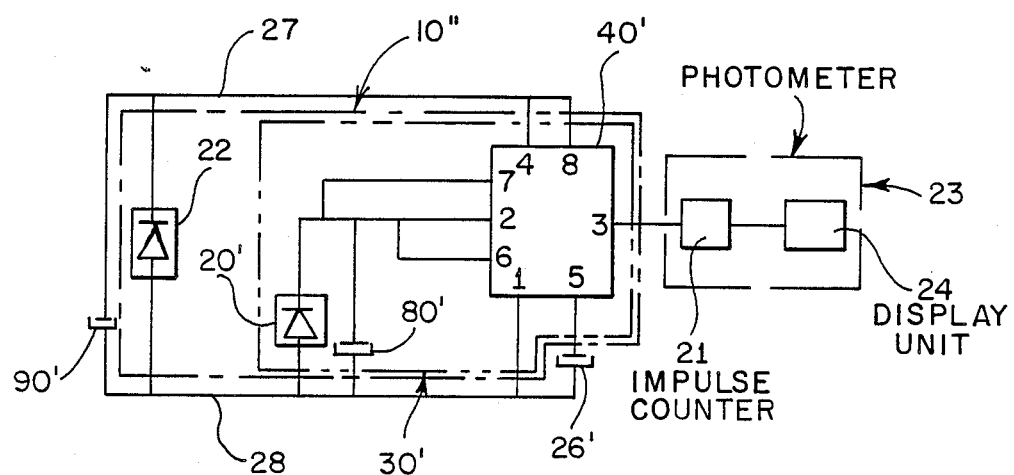
FIG. 3 is an assembly circuit for the electric signal system of the type shown in FIG. 2, in the case of application to a light integrator.

In FIG. 3, another application of the signal generating system has been represented according to the invention.

This generating system, marked 10" in FIG. 3, is identical in its components and in their assembly on the circuit as that (10') shown in FIG. 2. Hence, it will not be described again. A capacitor, such as 90', can always be provided at the terminals of the cell 22.

In this application, the output 3 of the multivibrator 40' is connected to an impulse counter 21, itself connected in series to a display unit 24.

The impulse counter or frequency divider 21 and the display unit 24, of the liquid-crystal type, for example, constitute a light integrator or photometer marked 23. This integrator counts the number of impulses it receives, which impulses are, as is understood, a frequency essentially proportional to the amount of light picked up by the photovoltaic cell serving as pickup.

Such a photometer may have many industrial applications. For example, it can be utilized in an optical-detection monitoring circuit.

Furthermore, should application of the electric signal generator of the invention be reserved for a step-by-step motor, it is in particular possible to envisage utilizing such a motor to drive modules or movable bodies of a decorative or advertising nature. This application is not, of course, limitative.

The step-by-step motor used in the invention is advantageously of the clockwork type, such as, for example, a quartz analog wall clock. Such a motor is known and will therefore not be described. However, it will be noted that, according to the invention, of the motor as a whole (not shown) only the rotor, the stator (corresponding to the coil 16), the reduction gears, and a means of transmission towards the outside of the movement of the motor thus constituted are kept. This means of transmission may in particular consist of the central pivot or axis of the clock's hands.

In other words, the quartz impulse generator and the frequency dividers of the chosen clockwork movement are replaced by the electric circuit serving as the signal generator system illustrated in FIG. 1 or FIG. 2, depending on whether it is desired to drive a motor at constant speed (FIG. 1) or at variable speed proportional to the illumination of the photocell serving as a pickup (FIG. 2).

As has just been stated, it is possible to envisage using such a motor to drive a movable body.

To this end, in addition to the electric signal generator of the type selected (according to that presented in FIG. 1 or FIG. 2), and in additional to the step-by-step motor of the type described above and fed or controlled by said selected signal generator, a flexible means of coupling to the movable body to be driven will advantageously be provided; the unit thus constituted serves as a drive sysem that is simple to realize and relatively inexpensive.

The flexible means of coupling to said means of transmission of the motor will advantageously consist of a thread of flexible elastic material. A single thread of drawn plastic may in particular be provided.

However, as a variant, a spiral spring may be provided. As is understood, this listing is not, however, limitative.

Regarding the photovoltaic cell, or any photovoltaic cells that may be utilized, it will be noted that in most applications of the electric signal generator system of the invention, this cell is sensitive to the visible spectrum of light. Hence, an amorphous silicon cell will preferably be chosen.

Different components may be utilized in the assemblies of the invention that have been described.

By way of example, the possible use as multivibrators 40, 40' of a circuit of the CMOS 555 type, manufactured by TEXAS INSTRUMENTS, will be noted. The frequency divider or shaping circuit 25 and the impulse counter 21 of the photometer could be of the CMOS CD 4027 type, also manufactured by TEXAS INSTRUMENTS. A vacuum cell 20, 22 of about 3 V would also be quite suitable.

I claim:

1. Light integrator signal generator system comprising:
   a signal generating device including:
   a low-energy electrical current generator;
   an impulse generator being connected across the low-energy electrical current generator via a feed line and a ground line; wherein the impulse generator includes:
   a capacitor having one terminal connected to the ground line of the circuit and the other terminal connected with three input terminals of an astable multivibrator;
   a photovoltaic cell illuminated by a light source and connected across the terminals of the capacitor, the cell supplying the capacitor with electrical energy;
   wherein the astable multivibrator is controlled by the capacitor and supplied with electrical energy by the low-energy electrical current generator via the feed line and the ground line, the multivibrator delivering at its output an electric signal whose frequency is proportional to the amount of light picked up by the photovoltaic cell; and a photometer including a display unit and an impulse counter for receiving the signal delivered at the output of the multivibrator.

2. System for driving a movable body comprising:
a signal generator system including:
a low-energy electric current generator; and
an impulse generator connected across the low-energy electric current generator via a feed line and a ground line, and delivering a signal which is a function of the electrical energy supplied by the current generator;
an amplification unit connected to an output terminal of the impulse generator and including at least two branches in parallel, each including, in series, a resistor and a transistor, the respective emitters of the transistors being connected, respectively to the feed line of the circuit and to the ground line;
a step-by-step motor one coil of which is connected both to the ground line of the circuit and to a capacitor, the capacitor also being connected to the output of the amplification unit;
a flexible means coupled to a to be driven movable body, the flexible means also being connected to a transmission means of the step-by-step motor.

3. System according to claim 2, wherein the flexible means of coupling is a thread of flexible elastic material.

4. System according to claim 2, wherein the flexible means of coupling is a spiral spring.

5. Signal generator system comprising:
a low-energy electrical current generator;
an impulse generator connected across the generator via a feed line and a ground line; the impulse generator including;
a capacitor having one terminal connected to the ground line of the circuit and the other terminal connected with three input terminals of an astable multivibrator;
a photovoltaic cell illuminated by a light source and connected across the terminals of the capacitor, the cell supplying the capacitor with electrical energy;
wherein the astable multivibrator is controlled by the capacitor and supplied with electrical energy by the low-energy electrical current generator via the feed line and the ground line, the multivibrator delivering at its output an electric signal having a frequency which is proportional to the amount of light picked up by the cell.

6. Signal generator system comprising:

a low-energy electrical current generator;
an impulse generator connected across the generator via a feed line and a ground line; the impulse generator including:
at least two resistors, one of which may be adjustable, mounted in series with a capacitor, the resistors and capacitor being connected in series across the feed line and the ground line, and serving as an adjustable programming and/or signal shaping unit; and
an astable multivibrator having a first input terminal connected at the junction between the resistors, two other terminals of the multivibrator being connected at the junction between the adjustable resistor and the capacitor, the astable multivibrator, being supplied with electrical energy by the low-energy electrical current generator, serving as a cadence generator controlled by the programming unit and delivering to its output terminal an electrical signal having an essentially constant frequency which is a function of the supplied electrical energy.

7. System according to claim 6, further comprising a capacitor connected across the terminals of the low-energy electrical current generator.

8. System according to claim 5, further comprising a capacitor connected across the terminals of the low-energy electrical current generator.

9. System according to claim 6, wherein the output terminal of the impulse generator is connected to an amplification unit including at least two branches mounted in parallel, each branch including, in series, a resistor and a transistor, the respective emitters of the transistors being connected across, respectively, the feed line and the ground line.

10. System accordng to claim 9, further comprising another resistor mounted in series with a capacitor connected in parallel to the terminals of the resistor of each of the branches of the amplification unit.

11. System according to claim 5, further comprising a signal shaping circuit connected across the feed line and the ground line, the signal shaping circuit receiving and processing the electric signal delivered at the output by the multivibrator and before the same is received by the amplification unit.

12. Generator system according to claim 6, wherein the low-energy electrical current generator is a photovoltaic cell sensitive to the visible spectrum of light.

13. Generator system according to claim 12, wherein the photovoltaic cell is an amorphous silicon cell.

* * * * *

UNITED STATES PATENT AND TRADEMARK OFFICE
CERTIFICATE OF CORRECTION

PATENT NO. : 4,782,276
DATED : November 1, 1988
INVENTOR(S) : Charles Guterman

It is certified that error appears in the above-identified patent and that said Letters Patent is hereby corrected as shown below:

In the Abstract, line 1, change "electrical signal" to

--electric signal--.

Column 3, line 14, change "16" to --17--.

Column 3, line 37, change "resistors 70" to --resistor 70--.

Column 3, line 47, change "PNP 13" to --PNP transistor 13--.

Column 4, line 44, change "20°" to --20'--.

Column 6, line 17, change "additional" to --addition--.

Column 8, line 35, change "accordng" to --according--.

Signed and Sealed this

Second Day of May, 1989

Attest:

DONALD J. QUIGG

Attesting Officer

Commissioner of Patents and Trademarks